Nov. 18, 1952     O. E. DE LANGE     2,618,686
DISTORTION INDICATOR

Filed March 1, 1948     2 SHEETS—SHEET 1

INVENTOR
O. E. DE LANGE
BY Walter M. Hill
ATTORNEY

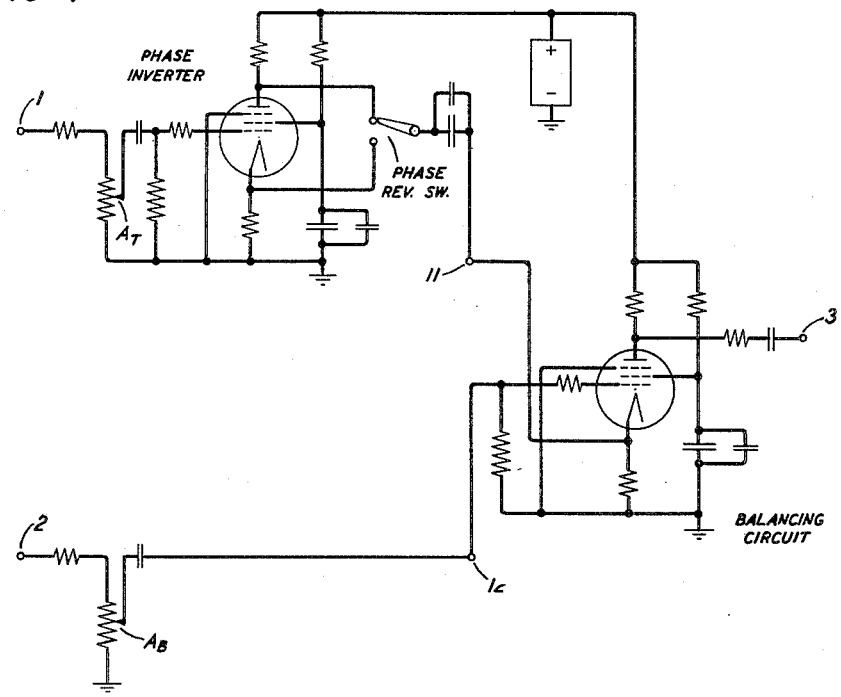
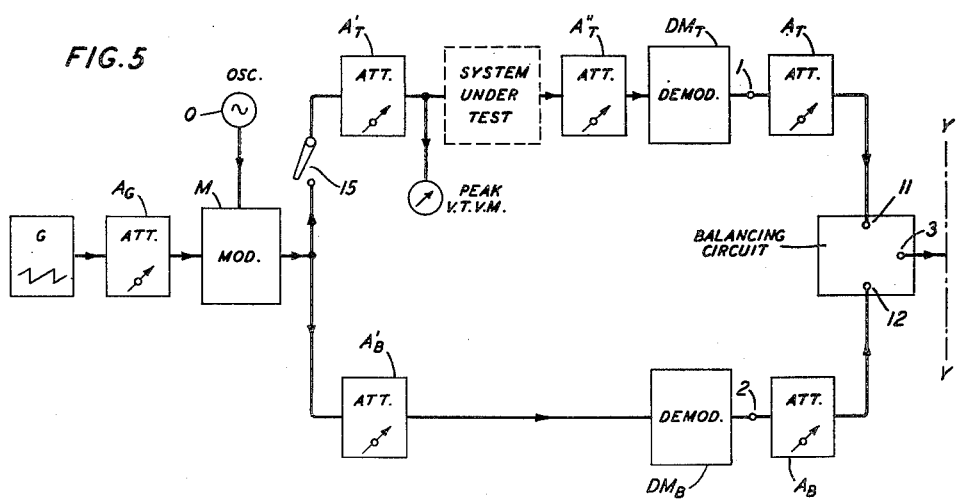

Patented Nov. 18, 1952

2,618,686

UNITED STATES PATENT OFFICE 2,618,686

DISTORTION INDICATOR

Owen E. De Lange, East Orange, N. J., assignor to Bell Telephone Laboratories, Incorporated, New York, N. Y., a corporation of New York Application March 1, 1948, Serial No. 12,391

13 Claims. (Cl. 175—183)

This invention comprises a method of and a means for observing the distortion of a transmission device.

In television and other pulse systems it is often desirable to have a direct measure of distortion such as that due to compression, expansion or poor low frequency response rather than to measure this distortion in terms of harmonic content. Compression or expansion can be determined by making a plot of input against output for the system under test. This method becomes difficult when a high degree of accuracy is required since an attenuator calibrated in very small steps or an output indicator of a high degree of accuracy is necessary. Also, small amounts of instability of the system makes accurate measurements difficult. By utilizing the method and apparatus of this invention, measurements of distortion may be made with a high order of accuracy without the necessity of using equipment having a high degree of accuracy or stability.

It is therefore the object of this invention to provide a method of and a means for observing the distortion of a transmission device which may use very simply constructed apparatus having no rigid requirements for accuracy or stability.

The foregoing object is achieved by this invention which provides a method of and a means for measuring the distortion of an electric transmission device which comprises passing an electric pulse of arbitrary wave form through said device, subtracting the transmitted pulse from the original pulse and observing the magnitude of the resulting difference pulse.

The invention may be better understood by referring to the accompanying drawings in which.

Figure 3:
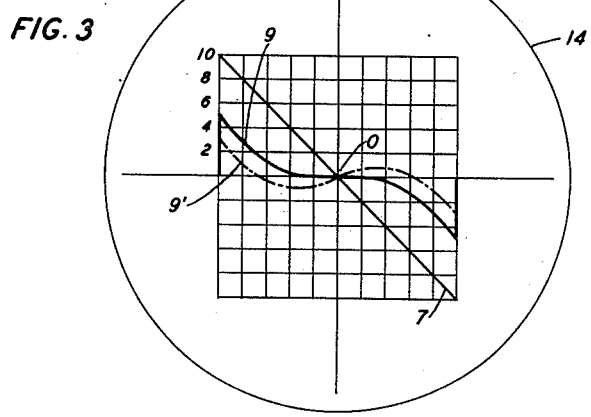

Fig. 3 discloses one type of oscillogram that may be observed on the oscilloscope screen to illustrate the balance condition when a saw-tooth wave form is used as the wave form of the testing source;

Fig. 4 discloses detail circuits of the simple attenuators and the balancing circuits which may be employed in the practice of this invention; and Fig. 5 is another block diagram of a slightly different embodiment of the invention especially adapted for testing intermediate frequency or radio frequency amplifiers and networks.

Figure 1:
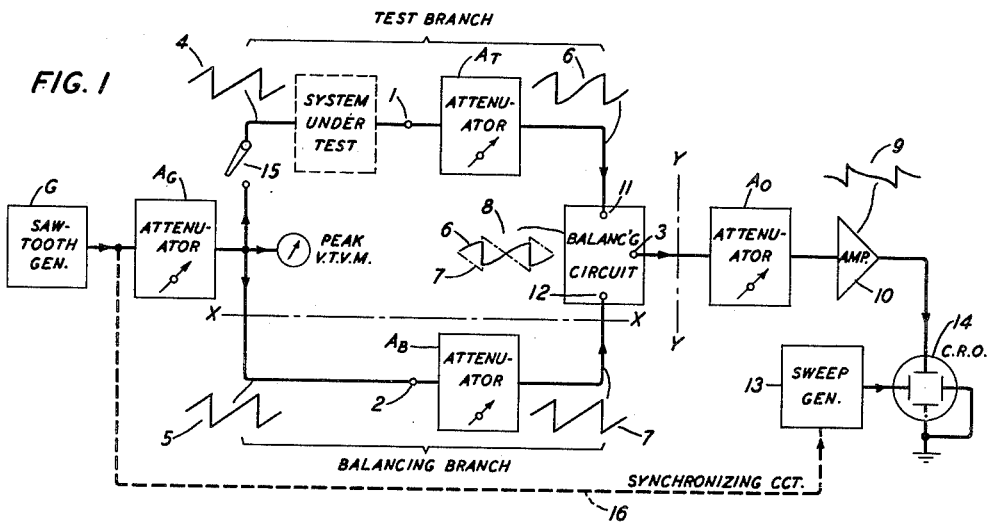
Fig. 1 is a block diagram of the essential components of one embodiment of the invention.

Referring now to Fig. 1 it will be noted that there are two transmission branches or paths feeding into a balancing circuit at terminals 11 and 12. Both of these transmission branches are supplied with energy from a generator G, the output of which may be adjusted in amplitude by a generator attenuator $A_G$. The wave form of this generator may be of any arbitrary shape as, for example, a sine wave, a saw-tooth shape or a square wave. The selection of the particular wave form is determined largely by the character of the apparatus to be tested.

To illustrate the invention, it is assumed that the apparatus under test is best tested by means of a saw-tooth wave form as shown at 4 and 5, respectively. The output of this generator G, after attenuation by the attenuator $A_G$, is applied to the input of the system under test through a switch 15. The system under test is located in the upper transmission branch of Fig. 1 and its output is connected through terminal 1 to the attenuator $A_T$ in the test branch, after which it is applied to the terminal 11 of the balancing circuit.

The lower transmission branch of Fig. 1 is the balancing branch. Signal from the generator is applied to the attenuator $A_B$ through terminal 2, and the output of the attenuator is applied to the balancing circuit by way of terminal 12.

After making suitable amplitude adjustments in a manner to be more particularly described later, the difference wave from the balancing circuit is applied to the vertical deflector plates of a cathode ray oscilloscope 14 by way of the output attenuator $A_O$ and amplifier 10.

The horizontal deflector plates of the cathode ray oscilloscope 14 is supplied with a linear sweep from the sweep generator 13. While this sweep need not necessarily be linear with time, it is preferred that it be so for the particular embodiment selected to illustrate this invention. If desired, the sweep generator can be synchronized with the saw-tooth wave from generator G by way of a synchronizing circuit 16. It is, of course, obvious that it is not essential that these two generators be synchronized automatically in this manner as a manual adjustment of the frequency of sweep generator 13 can work quite well in most cases.

To facilitate adjusting the output voltage of the generator attenuator $A_G$, a peak vacuum tube voltmeter is connected to its output as shown in Fig. 1. It may here be stated that instead of using the peak vacuum tube voltmeter, the cathode ray oscilloscope 14 may be utilized by simply connecting its vertical plates to the output of the generator attenuator $A_G$. This connection is not shown in Fig. 1 but it is an obvious and a conventional use of such oscilloscopes.

The apparatus so far described has been referred to in only general terms but it will be recognized by those skilled in the art that all of these components are quite conventional and probably require very little detailed explanation. However, for the sake of completeness and to insure a thorough understanding of the invention, the various components will be described in somewhat greater detail.

The saw-tooth generator G may be of any of the well-known forms commonly used in oscilloscope practice, as for example, the arrangement shown in United States Patent 1,613,954, granted January 11, 1927 to W. A. Knoop or United States Patent 2,180,364 granted November 21, 1939 to F. R. Norton.

The generator attenuator $A_G$ may likewise be any of the many well-known forms. In its simplest form it may be a simple resistance potentiometer and this has been found to work quite satisfactorily in embodiments of this equipment which have already been used. While not necessarily excluded from use with this invention, it is preferable that this attenuator should not have a frequency characteristic. That is to say, its attenuation factor should be the same for all frequencies and if reactances are used it is preferable that they be so arranged as to maintain a substantially constant impedance load on the saw-tooth generator G.

The peak vacuum tube voltmeter may be of any of the many well-known types or in the alternative, for a given wave form, this voltmeter may be of any type as, for example, root-mean-square voltmeter or it may be the oscilloscope, as previously mentioned.

The test and balance branch attenuators $A_T$ and $A_B$, respectively, may likewise be of the simple resistance potentiometer type and should preferably meet the same requirements set forth above for the generator attenuator $A_G$.

The balancing circuit may be of any form which will provide an output proportional to the difference between the instantaneous voltages applied to the two input terminals 11 and 12 coming from the test branch and balancing branch respectively. One particular form of such circuit will be described in greater detail in Fig. 4.

The output attenuator $A_O$ may also be of the simple resistance potentiometer type or it may be combined in the amplifier 10 which may be a conventional amplifier of a type commonly used in the deflector circuits of cathode ray oscilloscopes.

From the brief description already given of the several components of this circuit, it will be evident that none of them require any extreme accuracy in their construction, a fact which will be made still more evident as the description of the operation of the circuit is studied.

The preferred manner of operating Fig. 1 will now be described, it being understood that other methods of operation are also possible within the scope of this invention. It may be assumed that power has been supplied to the saw-tooth generator G, the amplifier 10, the sweep generator 13, and to the various circuits of the cathode ray oscilloscope 14, all of which are conventional. Switch 15 is closed so as to apply energy from the generator to the input terminals of the system under test. The level of this energy is adjusted by the generator attenuator $A_G$ until the peak vacuum tube voltmeter indicates the required level specified for the test of this equipment or some suitable voltage level within the operating range of the equipment under test.

Switch 15 is then opened and the balancing attenuator $A_B$ is adjusted until the saw-tooth wave form 7 observed on the screen (Fig. 3) of the oscilloscope 14 has a peak value of ten divisions. Switch 15 is then closed to apply the voltage of saw-tooth wave form 4 to the input of the system under test. If the system under test introduces no distortion whatever, the output wave 6 will also be of a saw-tooth wave form identical in shape to that of wave 4. On the other hand, if distortion is introduced, the wave form may emerge from the test branch attenuator $A_T$ with a distorted form as shown by wave 6. This is introduced into the balancing circuit at terminal 11 while at the same time the original saw-tooth wave form, exemplified by wave 7, is introduced into the same balancing circuit at terminal 12.

In the balancing circuit, these two waves are applied in opposite phase as shown symbolically by the two superimposed waves at 8. The two waves 8 are made up of wave 6 shown in solid line and inverted wave 7 shown in dotted line. The balancing circuit will produce an output of wave form equal to the difference between these two waves so as to appear, when amplified, like wave 9. This latter wave is the one which actually appears on the oscilloscope screen as shown in Fig. 3.

In order to produce the wave 9, however, it is necessary that these two waves 6 and 7 be correctly balanced against each other. This is accomplished by adjusting the test branch attenuator $A_T$ until the resulting wave form 9 appears with as much of its center portion as possible substantially parallel or coincident with the horizontal axis at the origin 0 as shown in Fig. 3. If the peak amplitude of the distorted wave 6 is too large, the resulting wave form would appear as wave 9' in Fig. 3. On the other hand if the distorted wave form 6 is of too small an amplitude, the resulting wave form would be lifted sufficiently that its central portion would again not be substantially parallel or coincident with the horizontal axis. In practice, it has been found that this adjustment is quite easily made with accuracy so that the results are easily reproducible. When used for measuring compression and expansion in video amplifiers and in complete frequency modulation systems, it has been found that accuracies of the order of one per cent were obtainable without any special care in the circuit design.

It will be remembered that with the original adjustment of the balancing attenuator $A_B$, the wave 7 had a peak amplitude of ten divisions on the oscilloscope screen as shown in Fig. 3. Each of these divisions, then, represents ten per cent distortion and the peak amplitude of the difference wave 9 indicates the amount of distortion. The value may be considerably less than ten per cent in which case the wave 9 is preferably amplified. This may be conveniently accomplished in the following manner.

Having completed the balancing operation, the output attenuator $A_O$ is adjusted to increase the transmission through the output channel by exactly 20 decibels, after which any imperfection in balance is corrected by rebalancing with attenuator $A_T$ to make the balance more nearly perfect.

It will be observed that, if no distortion whatever took place in the system under test, the output wave 6 would be identical in shape to wave 7 and consequently, at balance, the wave form 9 would appear as a straight horizontal line coincident with the horizontal axis. Actually, however, since some distortion is assumed present and wave 6 is distorted, the wave form 9 is produced having a peak amplitude necessarily very much smaller than the ten divisions to which the peak amplitude of wave 7 was originally adjusted. In fact, this amplitude would be equal to the difference between the peak amplitudes of waves 6 and 7 as shown at 8. However, after the attenuator Ao has increased the transmission by 20 decibels this amplitude is amplified ten times so that each division on the oscilloscope screen now corresponds with one per cent distortion. For the illustrative example shown in Fig. 3, wave form 9 indicates a distortion of five per cent, which is the peak amplitude of this difference wave.

To clearly fix the operation of this apparatus in mind it will be very briefly restated. In order to practice this invention, the signal voltage, which is the saw-tooth voltage 4, is applied to the system under test and the resultant output voltage, after being adjusted in amplitude, is balanced against the original signal voltage in a balancing circuit. The balance is adjusted to give a perfect balance for very low levels of signal through the system under test. As a result, only the distortion components produced at the higher levels of modulation appear at the output of the amplifier. Attenuators are provided for accomplishing this balancing operation and these attenuators need not be calibrated. With the output voltage of saw-tooth generator G adjusted to give the desired amplitude of signal for the system under test, switch 15 is opened and the balancing attenuator $A_B$ adjusted to give a vertical deflection of ten divisions on the oscilloscope screen. Then each division on the screen represents ten per cent of the peak-to-peak value of the input voltage. Switch 15 is then closed and the test attenuator $A_T$ is adjusted to give an approximate balance. The gain is then increased between the output of the balancing circuit and the cathode ray oscilloscope by 20 decibels and the test attenuator $A_T$ is again adjusted for perfect balance at the center of the figure. Now each division on the screen represents one per cent distortion. It is not necessary that the signal voltage be of perfect saw-tooth form since distortion is determined by comparing input with output. The test equipment can be checked for proper operation by repeating the test procedure with the apparatus under test omitted from the test branch. The same signal is then applied to both input terminals of the balancing circuit and at balance the oscilloscope should show only a horizontal line.

One factor which affects the operation of this method is delay through the system under test. As a result the voltage derived from the test branch is shifted in time with respect to the voltage derived from the balancing branch so that perfect cancellation cannot be obtained. This is made evident by a large residual "spike" at the beginning of each saw-tooth. If delay is small in comparison to repetition time, its effect upon the measurement of expansion and compression is negligible, although it does make it difficult to determine distortion produced by improper high frequency response of the system under test. If the delay time is comparable to or much greater than the repetition time, the latter time can be adjusted to make the delay time equal to an exact multiple of the repetition time, thereby nullifying the effect of the delay. This, of course, is accomplished by merely changing the frequency of the saw-tooth generator which, of course, changes the repetition rate. This method of correcting for delay has been successfully employed in microwave systems having a delay of approximately 400 microseconds.

Figure 2:
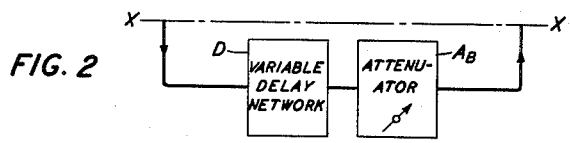
Fig. 2 shows a slight modification of Fig. 1.

Another method of overcoming the delay problem is to employ a variable delay network in the balancing branch as indicated in Fig. 2. Fig 2 is substituted for the balancing branch at line X—X of Fig. 1. This substitution is obvious and requires no further description. The variable delay network D may be a coaxial line or it may be a delay line of the type shown, for example, in United States Patent 2,403,561 granted July 9, 1946, to John P. Smith, or in United States Patent 2,416,297 granted February 25, 1947, to T. R. Finch and D. A. McLean. Designs of such networks have been discussed in an article in Electronics for June 1945, page 135, entitled "Artificial Delay Line Design" by J. B. Trevor.

The operation of the variable delay network D of Fig. 2, when it is used with the apparatus of Fig. 1, is obvious when it is considered that coincidence of the signals at the balancing circuit will be achieved whenever the delay time through the two branches is equal, that is, the delay time through network D is made equal to the delay time through the system under test.

Most any kind of balancing circuit which will receive the two voltages 6 and 7 and transmit their difference from terminal 3 is satisfactory for the practice of this invention. However, the circuit of Fig. 4 is preferred because of its simplicity. In Fig. 4 it will be noted that the terminals 1, 2 and 3 correspond with terminals 1, 2 and 3 of Fig. 1. The attenuator $A_T$ in the test branch is shown as a simple potentiometer. The phase inverter tube is of a conventional type well known in the art and is provided in order to invert the wave form coming from the system under test whenever that is necessary. The phase reversal is accomplished by throwing the phase reversing switch from the anode to the cathode and it will be understood that this will apply to terminal 11 of the balancing circuit a voltage of either one phase or the exact opposite phase. The input terminals of the balancing circuit proper are terminals 11 and 12, just as in Fig. 1. Here it will be seen that the output from the test branch is applied to the cathode of the balancing circuit amplifier by way of terminal 11, whereas the output from the balancing branch, after passing through the balancing attenuator $A_B$, is applied to the grid of the balancing circuit amplifier by way of terminal 12. These inputs have an opposite phase effect in the plate circuit of this amplifier and consequently tend to balance each other. If they are of the same wave form and amplitude they will exactly balance each other so that no output will be observed at terminal 3. If distortion occurs and there is a difference, then this difference output will appear at terminal 3 and is transmitted through the output attenuator Ao, the amplifier 10 and to the vertical deflector plates of the cathode ray oscilloscope 13 as shown in Fig. 1.

The various resistors and capacitors and their connections to the tubes shown in Fig. 4 are of such a conventional nature that a further detailed description thereof is believed entirely unnecessary.

Fig. 5 discloses another embodiment of this invention in which the invention is applied to the testing of systems involving intermediate frequency or radio frequency amplifiers. For this purpose a modulator and two demodulators are made a part of the test equipment. In order to minimize the effect of distortion produced in the modulation and demodulation processes the modulator is made common to the two branches and the two demodulators should be identical in structure and operated identically. In Fig. 5 the modulator M is shown connected between the generator attenuator A_G and the two test branches. The modulating frequency is obtained from an oscillator O. No specific circuit need be shown for this modulator or the associated oscillator as these circuits are entirely conventional and most any kind of modulator and oscillator circuit can be used in combination for this purpose. This is also true of the two demodulators DM_T in the test branch and DM_B in the balancing branch except, of course, as has already been stated, these two demodulators should be identical in structure and operated identically.

In connection with the arrangement of Fig. 5 at least one additional attenuator must be connected in the test branch just ahead of the system under test. In Fig. 5 this is shown as attenuator A_T'. This becomes evident when it is realized that the generator attenuator A_G is adjusted to get the proper input level to the modulator M, which may produce a level coming out of the modulator considerably too large for the system under test. The input to the system under test is then adjusted by means of test attenuator A_T' until the peak vacuum tube voltmeter indicates the proper level. Another attenuator A_T'' may also be inserted in the test branch ahead of the demodulator DM_T to properly adjust the input level to this demodulator. It may here be stated that in some cases it may be possible that the input level to the demodulator should be higher than provided by the output from the amplifier or other system under test. In such cases it is obvious that an amplifier would be intercalated between them and the gain adjustment thereof may take the place of the adjustment of the attenuator A_T''. Also, to properly adjust the input to the balancing demodulator DM_B, the auxiliary balancing attenuator A_B' is inserted in the balancing branch ahead of the demodulator. The rest of the circuit is identical with Fig. 1 and operates in exactly the same manner. In this connection it will be noted that the output attenuator, amplifier, sweep generator and cathode ray oscilloscope of Fig. 1 may be connected to Fig. 5 at the point Y—Y.

While this invention has been particularly described in connection with the use of a saw-tooth wave form for the test voltage, it is quite evident, from the nature of the test itself, that this particular wave form need not necessarily be used. In fact, the wave form of the saw-tooth generator need not be perfect but may contain considerable distortion. It is only necessary that exactly the same wave form be applied to the system under test as is transmitted through the balancing branch of the test circuit. It is, therefore, obvious that other wave forms such as the sine wave or square wave may be employed instead of the saw-tooth wave form so that this invention is not limited to any particular wave form but may employ a wave form of any arbitrary shape. If a saw-tooth form is used, it is of interest to observe that distances along the horizontal axis represent not only time, but also signal amplitude, because the latter is then a linear function of time. It, therefore, follows that since the ordinates of waves 9 in Fig. 3 represent amplitude of distortion, wave 9 is actually a plot of distortion versus input level when a linear saw-tooth wave is employed.

The rapidity with which measurements can be made with the apparatus and method of this invention makes the invention especially applicable to jobs where many measurements must be made such as in production testing, for example, and to the lining up and adjusting of circuits for minimum distortion.

What is claimed is:

1. The method of measuring the distortion of an electric transmission device, comprising passing an electric pulse of arbitrary wave form through said device, subtracting the transmitted pulse from the original pulse, and displaying the magnitude and wave form of the resulting difference pulse.

2. The method of measuring the distortion of an electric transmission device comprising passing an electric pulse of arbitary wave form through said device, subtracting the transmitted pulse from the original pulse, applying the resulting difference pulse to the deflector plates of a cathode ray oscilloscope, adjusting the relative magnitudes of the original pulse and the one passed through said device until a predetermined balance condition is reached, and displaying the magnitude and wave form of the resulting difference pulse on the oscilloscope screen.

3. The method of measuring the distortion of an electric transmission device, comprising passing an electric pulse of triangular wave form through said device, combining the transmitted pulse with the original triangular pulse in opposite phase to derive a difference pulse, the peak amplitude whereof is proportional to the amount said triangular pulse is distorted in passing through said device, and applying said difference pulse to deflector electrodes of a cathode ray oscilloscope.

4. A distortion measuring system for measuring the distortion of an electric transmission device having input and output terminals, comprising a source of voltage of arbitrary wave form, a first circuit path for connecting said source to the input terminals of said device, a balancing circuit with terminals connected to the output terminals of said device, whereby said balancing circuit may receive a voltage from said source, the wave form whereof is modified by the distortion properties of the device under test, a second circuit path from said source to said balancing circuit for providing an undistorted voltage for balancing against the voltage from the first path, and an oscilloscope connected to output terminals on said balancing circuit to indicate the magnitude and wave form of the unbalanced difference between the voltages transmitted over said two paths.

5. A distortion measuring system for measuring the distortion of an electric transmission device having input and output terminals, comprising a source of voltage of arbitrary wave form, a first circuit path for connecting said source to the input terminals of said device, said path including a switch, a balancing circuit with terminals connected to the output terminals of said device, whereby said balancing circuit may receive a voltage from said source, the wave form whereof is modified by the distortion properties of the device under test, a second circuit path from said source to said balancing circuit for providing an undistorted voltage for balancing against the voltage from the first path, and an oscilloscope connected to output terminals on said balancing circuit to indicate the magnitude and wave form of the unbalanced difference between the voltages transmitted over said two paths.

6. A distortion measuring system for measuring the distortion of an electric transmission device having input and output terminals, comprising a source of voltage of arbitrary wave form, said source including means in circuit therewith for adjusting the amplitude of the voltage, a first circuit path including a switch for connecting said source to the input terminals of said device, a balancing circuit with terminals connected to the output terminals of said device, whereby said balancing circuit may receive a voltage from said source, the wave form whereof is modified by the distortion properties of the device under test, a second circuit path from said source to said balancing circuit for providing an undistorted voltage for balancing against the voltage from the first path, and an oscilloscope connected to output terminals on said balancing circuit to indicate the magnitude and wave form of the unbalanced difference between the voltages transmitted over said two paths.

7. A distortion measuring system for measuring the distortion of an electric transmission device having input and output terminals, comprising a source of voltage of arbitrary wave form, said source including means in circuit therewith for adjusting the amplitude of the voltage, a first circuit path including a switch for connecting said source to the input terminals of said device, a balancing circuit with terminals connected to the output terminals of said device, whereby said balancing circuit may receive a voltage from said source, the wave form whereof is modified by the distortion properties of the device under test, an attenuator connected to the path between the output terminals of said device and said balancing circuit for adjusting the amplitude of said distorted voltage, a second circuit path from said source to said balancing circuit for providing an undistorted voltage for balancing against the voltage from the first path, and an oscilloscope connected to output terminals of said balancing circuit to indicate the magnitude and wave form of the unbalanced difference between the voltages transmitted over said two paths.

8. A distortion measuring system for measuring the distortion of an electric transmission device having input and output terminals, comprising a source of voltage of arbitrary wave form, said source including means in circuit therewith for adjusting the amplitude of the voltage, a first circuit path including a switch for connecting said source to the input terminals of said device, a balancing circuit with terminals connected to the output terminals of said device, whereby said balancing circuit may receive a voltage from said source, the wave form whereof is modified by the distortion properties of the device under test, an attenuator connected in the path between the output terminals of said device and said balancing circuit for adjusting the amplitude of said distorted voltage, a second circuit path from said source to said balancing circuit also including an attenuator for providing an undistorted voltage of controllable amplitude for balancing against the voltage from said first path, and an oscilloscope connected to output terminals on said balancing circuit to indicate the magnitude and wave form of the unbalanced difference between the voltages transmitted over said two paths.

9. A distortion measuring system for measuring the distortion of an electric transmission device having input and output terminals, comprising a source of voltage of arbitrary wave form, a first circuit path connecting said source to the input terminals of said device, a balancing circuit with terminals connected to the output terminals of said device, whereby said balancing circuit may receive a voltage from said source, the wave form whereof is modified by the distortion properties of the device under test, a second circuit path from said source to said balancing circuit for providing an undistorted voltage for balancing against the voltage from the first path, an oscilloscope connected to output terminals on said balancing circuit to indicate the magnitude and wave form of the unbalanced difference between the voltages transmitted over said two paths, and a gain control means included in the path between the oscilloscope and the output terminals of said balancing circuit adapted to change the gain in said path by a fixed known amount.

10. A distortion measuring system for measuring the distortion of an electric transmission device having input and output terminals, comprising a source of voltage of arbitrary wave form, said source including means in circuit therewith for adjusting the amplitude of the voltage, a first circuit path including a switch for connecting said source to the input terminals of said device, a balancing circuit with terminals connected to the output terminals of said device, whereby said balancing circuit may receive a voltage from said source, the wave form whereof is modified by the distortion properties of the device under test, an attenuator connected in the path between the output terminals of said device and said balancing circuit for adjusting the amplitude of said distorted voltage, a second circuit path from said source to said balancing circuit also including an attenuator for providing an undistorted voltage of controllable amplitude for balancing against the voltage from said first path, an oscilloscope connected to the output terminals on said balancing circuit to indicate the magnitude and wave form of the unbalanced difference between the voltages transmitted over said two paths, and a gain control means included in the path between the oscilloscope and the output terminals of said balancing circuit adapted to change the gain in said path by a fixed known amount.

11. A distortion measuring system for measuring the distortion of an electric transmission device having input and output terminals, comprising a source of voltage of arbitrary wave form, an oscillator and a modulator, said modulator having input circuits connected to receive voltages from both said source and said oscillator, an output circuit for said modulator, a first circuit path for connecting said modulator output circuit to the input terminals of said device, a demodulator connected to the output terminals of said device, a balancing circuit connected to said demodulator whereby said balancing circuit may receive a voltage, the wave form whereof is modified by the distortion properties of the device under test, a second circuit path from said modulator output circuit to said balancing circuit including a second demodulator substantially identical to said first-named demodulator whereby said modulator may supply to the balancing circuit an undistorted voltage for balancing against the voltage from the first path, and a cathode ray oscilloscope connected to the balancing circuit to indicate the magnitude and wave form of the unbalanced difference between the voltages transmitted over said two paths.

12. The combination of claim 11 and a voltage adjusting means included in said source of arbitrary wave form for adjusting the amplitude of said voltage, and a switch in series with said first circuit path.

13. The combination of claim 11 and a gain control means included in the path between the oscilloscope and the balancing circuit adapted to change the gain in said path by a fixed known amount.

OWEN E. DE LANGE.

REFERENCES CITED

The following references are of record in the file of this patent:

UNITED STATES PATENTS

| Number | Name | Date |
| --- | --- | --- |
| 2,047,782 | Jensen | July 14, 1936 |
| 2,094,472 | Rohats | Sept. 28, 1937 |
| 2,143,094 | Swift | Jan. 10, 1939 |
| 2,371,636 | McConnell | Mar. 20, 1945 |
| 2,380,791 | Rosencrans | July 31, 1945 |
| 2,471,530 | Lobel | May 31, 1949 |

FOREIGN PATENTS

| Number | Country | Date |
| --- | --- | --- |
| 912,880 | France | May 13, 1946 |

(Corresponding U. S. Patent 2,534,957, Dec. 19, 1950)

OTHER REFERENCES

Radio News, January 1944, pages 24, 25, 78, 80 and 82.

Proceedings of the I. R. E., June 1944, pages 339–348.

Moritz, Electronics, June 1946, pages 130–135.